United States Patent
Yang et al.

(10) Patent No.: US 9,945,948 B2
(45) Date of Patent: Apr. 17, 2018

(54) METHOD AND APPARATUS FOR PROVIDING TIME-OF-FLIGHT CALCULATIONS USING DISTRIBUTED LIGHT SOURCES

(71) Applicant: Nokia Technologies Oy, Espoo (FI)

(72) Inventors: Ruigang Yang, Lexington, KY (US); Xin Chen, Evanston, IL (US)

(73) Assignee: Nokia Technologies Oy, Espoo (FI)

( * ) Notice: Subject to any disclaimer, the term of this patent is extended or adjusted under 35 U.S.C. 154(b) by 311 days.

(21) Appl. No.: 14/743,602

(22) Filed: Jun. 18, 2015

(65) Prior Publication Data
US 2016/0370462 A1    Dec. 22, 2016

(51) Int. Cl.
| | |
|---|---|
| *G01S 17/46* | (2006.01) |
| *G01S 7/48* | (2006.01) |
| *G01S 7/481* | (2006.01) |
| *G01S 7/497* | (2006.01) |

(52) U.S. Cl.
CPC .......... *G01S 17/46* (2013.01); *G01S 7/4815* (2013.01); *G01S 7/497* (2013.01)

(58) Field of Classification Search
CPC ........ G01S 17/46; G01S 7/4815; G01S 7/497; G01S 17/89; G06T 2207/10028; G06T 7/521; G06T 7/586
See application file for complete search history.

(56) References Cited

U.S. PATENT DOCUMENTS

| | | | | |
|---|---|---|---|---|
| 6,822,687 | B1 * | 11/2004 | Kakiuchi | G01C 3/08 348/207.99 |
| 7,737,393 | B2 * | 6/2010 | Fouquet | G01S 17/46 250/221 |
| 2004/0201586 | A1 * | 10/2004 | Marschner | G06K 9/4661 345/426 |
| 2013/0182897 | A1 * | 7/2013 | Holz | G06K 9/00711 382/103 |
| 2014/0184749 | A1 * | 7/2014 | Hilliges | G01S 17/89 348/47 |
| 2014/0340569 | A1 | 11/2014 | Raskar et al. | |

(Continued)

OTHER PUBLICATIONS

Zhu et al., "Fusion of Time-of-Flight Depth and Stereo for High Accuracy Depth Maps", IEEE Conference on Computer Vision and Pattern Recognition, 2008, pp. 1-8.

(Continued)

*Primary Examiner* — Eric L Bolda
(74) *Attorney, Agent, or Firm* — Ditthavong & Steiner, P.C.

(57) ABSTRACT

An approach is provided for acquiring both depth and surface normal of an object using a time-of-flight sensor with multiple distributed light sources. The approach involves causing, at least in part, at least one sequential illumination of at least one object by a plurality of distributed light sources associated with a time-of-flight sensor. The approach also involves causing, at least in part, a capturing of reflected light intensity data using the time-of-flight sensor during the at least one sequential illumination. The approach further involves processing and/or facilitating a processing of the reflected light intensity data to determine at least one depth, at least one surface normal, or a combination thereof of the at least one object.

20 Claims, 10 Drawing Sheets

(56) References Cited

U.S. PATENT DOCUMENTS

2015/0001414 A1\* 1/2015 Morita .................. G01B 11/14
                                                    250/393
2015/0061509 A1   3/2015 Karlicek et al.
2015/0260845 A1\* 9/2015 Takemura ............. G01S 7/4815
                                                    356/3.11

OTHER PUBLICATIONS

Lottner et al., "Time-of-Flight Cameras with Multiple Distributed Illumination Units", 8th WSEAS International Conference on signal processing, Computational Geometry and Artificial Vision (ISCGAV'08), 2008, pp. 40-45.

Lang et al., "Bayesian Estimation of Distance and Surface Normal with a Time-of-Flight Laser Rangefinder", Second International Conference on 3-D Digital Imaging and Modeling, 1999, 9 pages.

\* cited by examiner

METHOD AND APPARATUS FOR PROVIDING TIME-OF-FLIGHT CALCULATIONS USING DISTRIBUTED LIGHT SOURCES

BACKGROUND

Service providers and developers are continually challenged to deliver value and convenience to consumers by, for example, providing compelling network services. One area of interest has been the development of time-of-flight (ToF) sensors. There are several ways of operation for time-of-flight sensors. All of them require multiple (at least two) flashes of light. For example, one known system requires two pulses of light to cancel out the effect of surface reflectance value. Another way of developing time-of-flight sensors is to modulate the outgoing light beam with a radio frequency (RF) carrier, then measure the phase shift of that carrier on the receiver end. A known ToF sensor requires four pulses of light. The time-of-flight sensors can switch at a high frame rate in which case the scene can be considered as static during the acquisition time of multiple frames. In all of these cases, the light and the imaging sensor are co-located. In addition, unlike traditional Laser Illuminated Detection and Ranging (LiDAR), a time-of-flight sensor is able to simultaneously capture a range map, instead of a single range value. This unique feature gives time-of-flight sensors the ability to capture dynamic or static scenes at a much faster rate compared to LiDAR. To obtain a high quality three-dimensional (3D) model from a range (depth) map, it is often necessary to compute normal at each sampling point (e.g., planar surface extraction clusters points with similar normal values). However, the accuracy of the calculated normal is sensitive to the depth resolution of the range map. Small relief patterns that have significant normal changes cannot be captured by a depth map since their depth variation is smaller than the depth resolution. In addition, the errors from depth map generation can be carried over or even magnified in the normal computation from the depth map. Accordingly, service providers and developers face significant technical challenges to enable users to simultaneously acquire depth and normal calculations without sacrificing the frame rate of a time-of-flight sensor.

SOME EXAMPLE EMBODIMENTS

Therefore, there is a need for an approach for acquiring both depth and surface normal of an object using a time-of-flight sensor with multiple distributed light sources.

According to one embodiment, a method comprises causing, at least in part, at least one sequential illumination of at least one object by a plurality of distributed light sources associated with a time-of-flight sensor. The method also comprises causing, at least in part, a capturing of reflected light intensity data using the time-of-flight sensor during the at least one sequential illumination. The method further comprises processing and/or facilitating a processing of the reflected light intensity data to determine at least one depth, at least one surface normal, or a combination thereof of the at least one object.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, at least one sequential illumination of at least one object by a plurality of distributed light sources associated with a time-of-flight sensor. The apparatus also causes, at least in part, a capturing of reflected light intensity data using the time-of-flight sensor during the at least one sequential illumination. The apparatus is further caused to process and/or facilitate a processing of the reflected light intensity data to determine at least one depth, at least one surface normal, or a combination thereof of the at least one object.

According to another embodiment, a computer-readable storage medium carries one or more sequences of one or more instructions which, when executed by one or more processors, cause, at least in part, an apparatus to cause, at least in part, at least one sequential illumination of at least one object by a plurality of distributed light sources associated with a time-of-flight sensor. The apparatus also causes, at least in part, a capturing of reflected light intensity data using the time-of-flight sensor during the at least one sequential illumination. The apparatus is further caused to process and/or facilitate a processing of the reflected light intensity data to determine at least one depth, at least one surface normal, or a combination thereof of the at least one object.

According to another embodiment, an apparatus comprises means for causing, at least in part, at least one sequential illumination of at least one object by a plurality of distributed light sources associated with a time-of-flight sensor. The apparatus also comprises means for causing, at least in part, a capturing of reflected light intensity data using the time-of-flight sensor during the at least one sequential illumination. The apparatus further comprises means for processing and/or facilitating a processing of the reflected light intensity data to determine at least one depth, at least one surface normal, or a combination thereof of the at least one object.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for acquiring both depth and surface normal of an object using a time-of-flight sensor with multiple distributed light sources are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to distributed light sources, it is contemplated that the approach described herein may be used with light emitting diodes (LEDs), and/or other distributed light sources (e.g., laser diodes).

Figure 1:
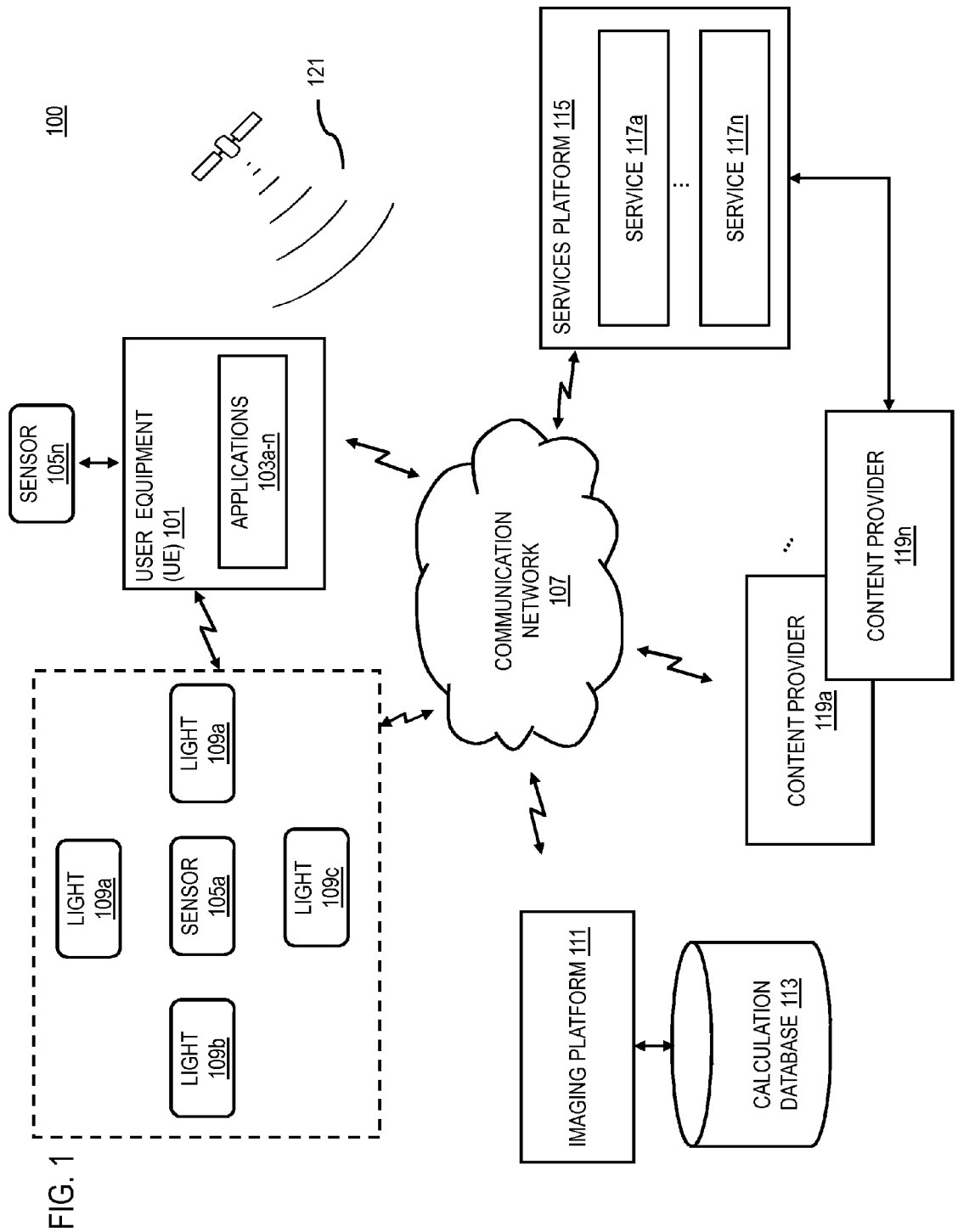
FIG. 1 is a diagram of a system capable of acquiring both depth and surface normal of an object using a time-of-flight sensor with multiple distributed light sources, according to one embodiment.

FIG. 1 is a diagram of a system capable of acquiring both depth and surface normal of an object using a time-of-flight sensor with multiple distributed light sources, according to one embodiment. As previously discussed, one area of interest among service providers and device manufacturers has been the development of time-of-flight sensors. However, in the known approaches, the light and the imaging sensor are co-located. Moreover, computing normal from depth maps is often fragile in practice and the accuracy is sensitive to the resolution of the range map and the relief of the objects. In addition, the errors from depth map generation can be carried over or even magnified in the normal computation from the depth map.

To address this problem, a system 100 of FIG. 1 introduces the capability to capture images that can be used to acquire both depth and surface normal of an object using a time-of-flight sensor with multiple distributed light sources without sacrificing the frame rate of the time-of-flight sensor. In one embodiment, the system 100 causes, at least in part, at least one sequential illumination of at least one object by a plurality of distributed light sources with a time-of-flight sensor. It is contemplated that the plurality of distributed light sources includes at least three (e.g., four) separately located light sources (e.g., LEDs). By way of example, the at least three separately located light sources may be located in a cross pattern around a time-of-flight sensor. It is further contemplated that the at least one object is diffuse. During run time, instead of flashing the scene with just one light, the system 100 may cause, at least in part, the plurality of distributed light sources to be flashed alternatively from different locations. The system 100 may then determine the surface normal of the at least one object since the at least one object is now under different illuminations. In contrast, if the system 100 caused, at least in part, the flash pattern to be all form a single light source, then the associated time-of-flight sensor would be unable to capture depth and surface normal at substantially the same time.

In one embodiment, the system 100 causes, at least in part, a capturing of reflected light intensity using the time-of-flight sensor during the at least one sequential illumination. By way of example, the system 100 may capture at least three reflected light intensity measures for a given pixel based, at least in part, on the at least one sequential illumination of the at least one object (e.g., using four separately located light sources).

In one embodiment, the system 100 processes and/or facilitates a processing of the reflected light intensity data to determine at least one depth, at least one surface normal, or a combination thereof of the at least object. By way of example, it is contemplated that the system 100 can determine at least three intensity values (e.g., $I_0$, $I_1$, $I_2$, $I_3$) and the range D. In one embodiment, the system 100 may then process and/or facilitate a processing of the newly recorded intensity values as a vector and cause, at least in part, a comparison of the respective intensity values against one or more entries in at least one look-up table to find its closest neighbor in the at least one look-up table. Thereafter, the system 100 may cause, at least in part, at least one assignment of the range value for the determined entry to be the depth value for this pixel. In one embodiment, wherein the at least one object is not white, not planar, and not facing the time-of-flight sensor, the system 100 may process and/or facilitate a processing of the reflected light intensity data to correct normal and to factor out the variation of albedo before causing, at least in part, a comparison of the respective intensity values against one or more entries in the at least one look-up table.

In one embodiment, the system 100 determines the at least one depth and the at least one surface normal from the reflected light intensity data at substantially the same time. By way of example, once the system 100 causes, at least in part, a normal correction and the variation of albedo is factored out for a non-white, non-planar, and non-facing the time-of-flight sensor object, the system 100 may determine both surface depth and normal at substantially the same time given the at least three time-of-flight raw sensor images taken under at least one distributed light set up (e.g., four separately located LEDs).

In one or more embodiments, the system 100 causes, at least in part, an alignment of at least one reference object along an optical axis of the time-of-flight sensor at a plurality of known distances from the time-of-flight sensor. By way of example, if a look-up table for at least one object is contemplated for a range between 1 meter (m) and 5 m and with a depth resolution of at least 10 mm, then the system 100 may cause, at least in part, an alignment of at least one reference object (e.g., a piece of white paper glued to a piece of cardboard) at 1 m, 1.01 m, . . . , 1.02 m, . . . , 4.99 m, 5 m.

In one embodiment, the system 100 causes, at least in part, a capturing of the reference reflected light intensity data of the at least one reference object at the plurality of known distances (e.g., 1 m, 1.01 m, . . . , 1.02 m, . . . , 4.99 m, 5 m). In particular, it is contemplated that the system 100 may capture the reference reflected light intensity data through the time-of-flight sensor for each of the separately located light sources (e.g., at least three images for each distance, each image taken with one light source (LED) turned on). It is further contemplated that the at least one sequential illumination of the at least one reference object is the same as the at least one sequential illumination of the at least one object.

In one embodiment, the system 100 processes and/or facilitates a processing of the reference reflected light intensity data to generate at least one look-up table. In one embodiment, the system 100 may treat the newly recorded intensity values as a vector and store and/or organize them (e.g., in a database). In one embodiment, the system 100 determines the at least one depth, the at least one surface normal, or a combination thereof of the at least one object based, at least in part, on at least one comparison of the reflected light intensity data to one or more entries of the at least one look-up table. For example, the system 100 may cause, at least in part, a comparison of the respective light intensity values against one or more entries in the at least one look-up table to determine its closest neighbor in the look-up table and the range value for the determined entry may then be assigned by the system 100 to be the depth value for this pixel. It is contemplated that the accuracy of the system 100's determination of the at least one depth, the at least one surface normal, or a combination thereof is dependent upon the granularity of the look-up table. Alternatively, in one embodiment, the system 100 determines (e.g., refines) the at least one depth, the at least one surface normal, or a combination thereof of the at least one object, based, at least in part, on an interpolation (e.g., a linear interpolation) from one or more neighboring entries of the at least one look-up table.

In one embodiment, wherein the at least one object is not white, planar, and facing the time-of-flight sensor, the system 100 causes, at least in part, at least one normalization of the reflected light intensity data based, at least in part, on a surface albedo of the at least one object to determine the at least one depth, the at least one surface normal, or a combination thereof of the at least one object. To deal with surface albedo variation, the system 100 normalizes the reflected light intensity values. For example, the normalized intensity vectors may be determined as follows: $(I_0/I_m, I_1/I_m, I_2/I_m, I_3/I_m)$ where $I_m = \min(I_0, I_1, I_2, I_3)$.

In one or more embodiments, wherein the at least one object is not white, planar, and facing the time-of-flight sensor, the system 100 also causes, at least in part, at least one surface normal correction based, at least in part, on at least one construction of at least one range map, at least one surface normal map, or a combination thereof to determine the at least one depth, the at least one surface normal, or a combination thereof of the at least one object. In particular, the at least one construction of the at least one range map, the at least one surface normal map, or a combination thereof is based, at least in part, on one or more photometric stereo techniques. In addition, it is contemplated that the system 100 is calibrated (i.e., that the incident light direction is known by the system 100, which is typical for photometric stereo). Given the surface normal at the current pixel location and the known incident light direction, the system 100 may correct the cosine fall-off factor. More specifically, $$I_0 = \cos(\alpha)L_0$$

$$I_0' = \cos(\beta)L_0$$

where $I_o'$ is the newly measured intensity level for the light 0; $\alpha$ is the angle between the incident light and the surface normal when the look-up table is constructed (e.g., angle 619 of FIG. 6A); and $\beta$ is the angle for the new measurement (e.g., angle 625 of FIG. 6B). Once both values are determined by the system 100, the system 100 can determine the normal-corrected intensity value as follows:

$$I_0'' = \frac{I_0'}{\cos(\beta)} * \cos(\alpha).$$

As shown in FIG. 1, the system 100 comprises a user equipment (UE) 101 that may include or be associated with applications 103*a*-103*n* (collectively referred to as applications 103), sensors 105*a*-105*n* (collectively referred to as sensors 105), and distributed light sources 109*a*-109*d* (collectively referred to as lights 109). In one embodiment, the UE 101 has connectivity to the imaging platform 111 via the communication network 107.

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as camera/imaging application, location-based service applications, navigation applications, mapping application, content provisioning services, media player applications, social networking applications, calendar applications, and the like. In one embodiment, one of the applications 103 at the UE 101 may act as a client for the imaging platform 111 and perform one or more functions associated with the functions of the imaging platform 111 by interacting with the imaging platform 111 over the communication network 107.

By way of example, the sensors 105 may be any type of sensor. In one embodiment, the sensors 105 (e.g., sensor 105a) may include, for example, a ToF sensor to compute the depth for each individual pixel based on the time difference between the time an infra-red light signal was emitted towards the object, and the time at which it was reflected back to the ToF sensor. In certain embodiments, the sensor 105 may include, for example, a camera/imaging sensor for gathering image data, an audio recorder for gathering audio data, a global positioning sensor for gathering location data (e.g., GPS), a network detection sensor for detecting wireless signals or receivers for different short-range communications (e.g., Bluetooth®, Wi-Fi, Li-Fi, near field communication (NFC), etc.), temporal information sensors, and the like. In one example embodiment, the UE 101 may include GPS receivers to obtain geographic coordinates from the satellites 121 for determining current location and time associated with the UE 101.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the lights 109 may include LEDs, laser diodes, or a combination thereof.

In one embodiment, the imaging platform 111 may be a platform with multiple interconnected components for capturing the reflected intensity of an object at one or more distances from the sensors 105 (e.g., sensor 105a). The imaging platform 111 may include multiple servers, intelligent networking devices, computing devices, components and corresponding software for reconstructing dynamic arbitrary specular objects. In addition, it is noted that the imaging platform 111 may be a separate entity of the system 100, a part of the one or more services 117a-117n (collectively referred to as services 117) of the services platform 115, or included within the UE 101 (e.g., as part of the applications 103).

In one embodiment, the calculation database 113 (e.g., a look-up table) stores reflected light intensity data (e.g., intensity images). For example, for each pixel location, the calculation database 113 may store four intensity values ($I_0$, $I_1$, $I_2$, $I_3$) (e.g., from lights 109a, 109b, 109c, and 109d) and the range D. In one embodiment, the calculation database 113 may also store lights 109 phase shift data, lights 109 positioning data, distance information to one or more objects (e.g., range D), one or more reference objects, depth value data for a particular pixel, range map data, surface map data, or a combination thereof. The information may be any multiple types of information that can provide means for aiding in the content provisioning and sharing process.

The services platform 115 may include any type of service. By way of example, the services platform 115 may include content (e.g., audio, video, images, etc.) provisioning services, application services, storage services, mapping services, navigation services, contextual information determination services, location based services, information (e.g., weather, news, etc.) based services, etc. In one embodiment, the services platform 115 may interact with the UE 101, the imaging platform 111 and the content provider 119a-119n (collectively referred to as content providers 119) to supplement or aid in the processing of the time-of-flight data information.

By way of example, the services 117 may be an online service that reflects interests and/or activities of users. In one scenario, the services 117 provide representations of each user (e.g., a profile), his/her social links, and a variety of additional information. The services 117 allow users to share location information, activities information, contextual information, historical user information and interests within their individual networks, and provides for data portability.

The content providers 119 may provide content to the UE 101, the imaging platform 109, and the services 117 of the services platform 115. The content provided may be any type of content, such as image content, textual content, audio content, video content, etc. In one embodiment, the content providers 119 may provide content that may supplement content of the applications 103, the sensors 105, or a combination thereof. By way of example, the content provider 119 may provide content that may aid in the calculation of the distance information for one or more objects. In one embodiment, the content provider 119 may also store content associated with the UE 101, the imaging platform 111, and the services 117 of the services platform 115. In another embodiment, the content providers 119 may manage access to a central repository of data, and offer a consistent, standard interface to data, such as a repository for surface normal information for one or more objects, range or distance information to one or more objects, depth information for one or more objects, or a combination thereof. Any known or still developing methods, techniques or processes for generating, retrieving, and/or accessing depth and/or surface normal information may be employed by the imaging platform 111.

By way of example, the UE 101, the sensor 105a, the imaging platform 111, the services platform 115, and the content providers 119 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
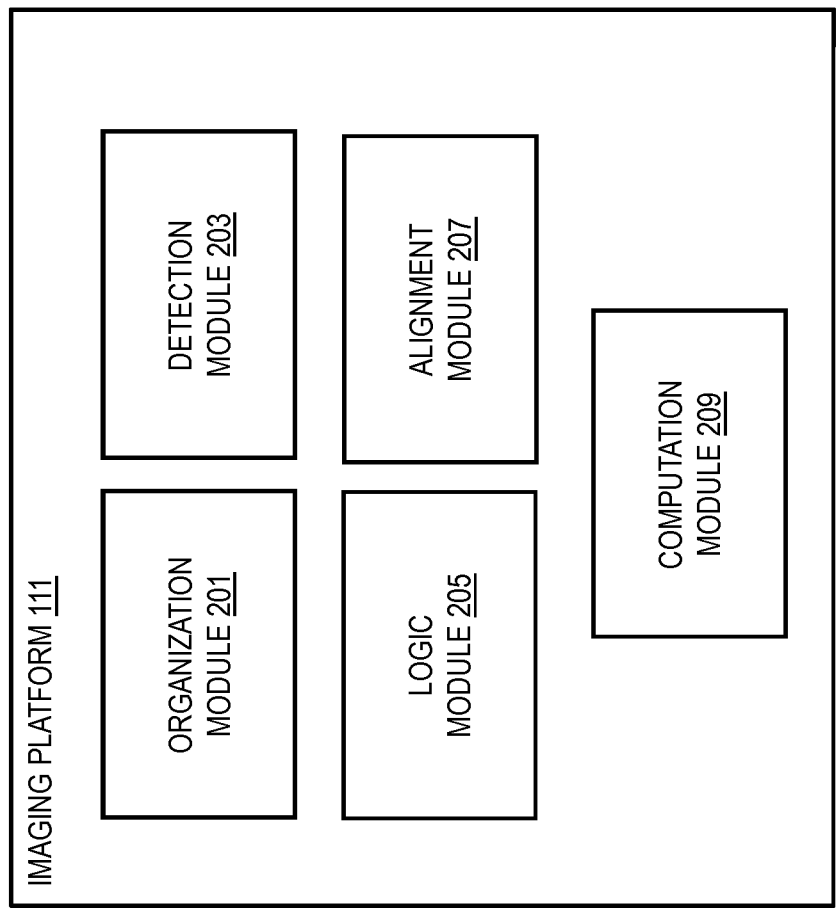
FIG. 2 is a diagram of the components of an imaging platform 111, according to one embodiment.

FIG. 2 is a diagram of the components of imaging platform 111, according to one embodiment. By way of example, the imaging platform 111 includes one or more components for acquiring both depth and surface normal of an object using a time-of-flight sensor with multiple distributed light sources. It is contemplated that the functions of these components may be combined in one or more components or performed by other components of equivalent functionality. In this embodiment, the imaging platform 111 includes an organization module 201, a detection module 203, a logic module 205, an alignment module 207, and a computation module 209.

In one embodiment, the organization module 201 may cause, at least in part, at least one sequential illumination of at least one object by a plurality of distributed light sources (e.g., at least three LEDs) associated with a time-of-flight sensor. For example, the organization module 201 may cause, at least in part, the plurality of distributed light sources to be flashed alternatively from different locations. The organization module 201 may also process and/or facilitate a processing of the reference reflected light intensity data to generate at least one look-up table. For example, the organization module 201 may treat the newly recorded intensity values as a vector and store and/or organize them in a database (e.g., the calculation database 113).

The detection module 203 in certain embodiments is used to cause, at least in part, a capturing of reflected light intensity data using the time-of-flight sensor during the at least one sequential illumination. By way of example, the detection module 203 may capture at least three reflected light intensity measures for a given pixel based, at least in part, on the at least one sequential illumination of the at least one object (e.g., using at least three separately located light sources). The detection module 203 may also be used to cause, at least in part, a capturing of reference reflected light intensity data of the at least one reference object at the plurality of known distances. By way of example, the detection module 203 may capture reference reflected light intensity data for each of the separately located light sources (e.g., at least three images for each distance, each image taken with one light source turned on).

In one embodiment, the logic module 205 is used to process and/or facilitate a processing of the reflected light intensity data to determine at least one depth, at least one surface normal, or a combination thereof of the at least one object. By way of example, it is contemplated that the logic module 205 can determine at least three intensity values (e.g., $I_0$, $I_1$, $I_2$, $I_3$) and the range D. In one embodiment, the logic module 205 can process and/or facilitate a processing of the newly recorded intensity values as a vector and cause, at least in part, a comparison of the respective intensity values against one or more entries in a look-up table to find its closest neighbor in the look-up table. Thereafter, the logic module 205 may cause, at least in part, at least one assignment of the range value for the determined entry to be the depth value for this pixel. In one embodiment, the logic module 205 may also be used to determine the at least one depth and the at least one surface normal from the reflected light intensity data at substantially the same time. By way of example, once the computation module 209 causes, at least in part, a normal correction and factors out the variation of albedo for a non-white non-planar object, the logic module 205 may determine both surface depth and normal at substantially the same time given the at least three time-of-flight raw sensor images taken under at least one distributed light set up (e.g., four separately located LEDs).

In one embodiment, the logic module 205 also may be used to determine the at least one depth, the at least one surface normal, or a combination thereof of the at least one object based, at least in part, on a comparison of the reflected light intensity data to the at least one look-up table. For example, the logic module 205 may cause, at least in part, a comparison of the respective light intensity values against one or more entries in the at least one look-up table to determine its closest neighbor in the look-up table and the range value for the determined entry may then be assigned by the logic module 205 to be the depth value for this pixel. The logic module may also be used to determine (e.g., refine) the at least one depth, the at least one surface normal, or a combination thereof of the at least one object based, at least in part, on at least one interpolation from one or more neighboring entries of the at least one look-up table (e.g., linear interpolation).

The alignment module 207 in certain embodiments is used to cause, at least in part, an alignment of at least one reference object along an optical axis of the time-of-flight sensor at a plurality of known distances from the time-of-flight sensor. By way of example, if a look-up table for at least one object is contemplated for a range between 1 m and 5 m and with a depth resolution of at least 10 mm, then the alignment module 207 can cause, at least in part, an alignment of at least one reference object (e.g., a piece of white paper glued to a piece of cardboard) at 1 m, 1.01 m, ..., 1.02 m, ..., 4.99 m, 5 m.

Figure 6A:
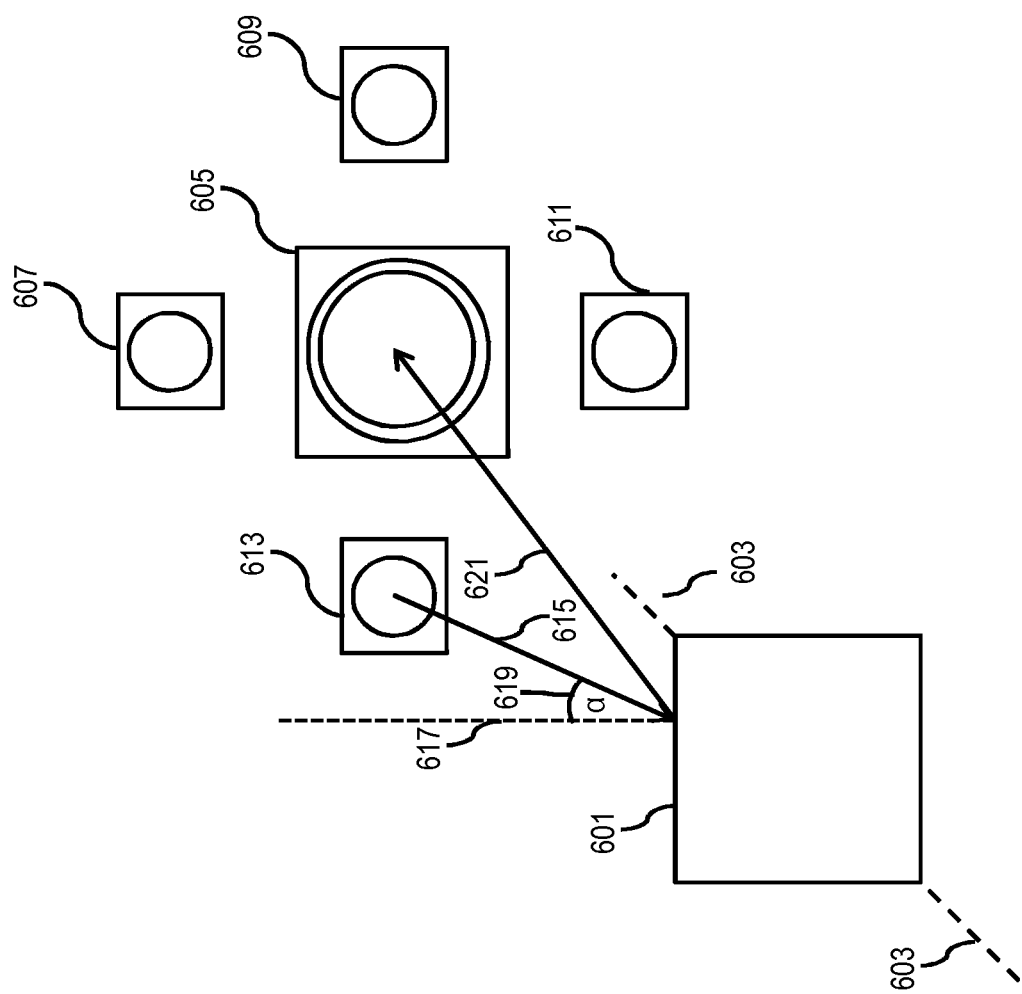
FIGS. 6A and 6B are diagrams of a time-of-flight design with multiple distributed light sources utilized in the processes of FIGS. 3-5, according to various embodiments.
Figure 6B:
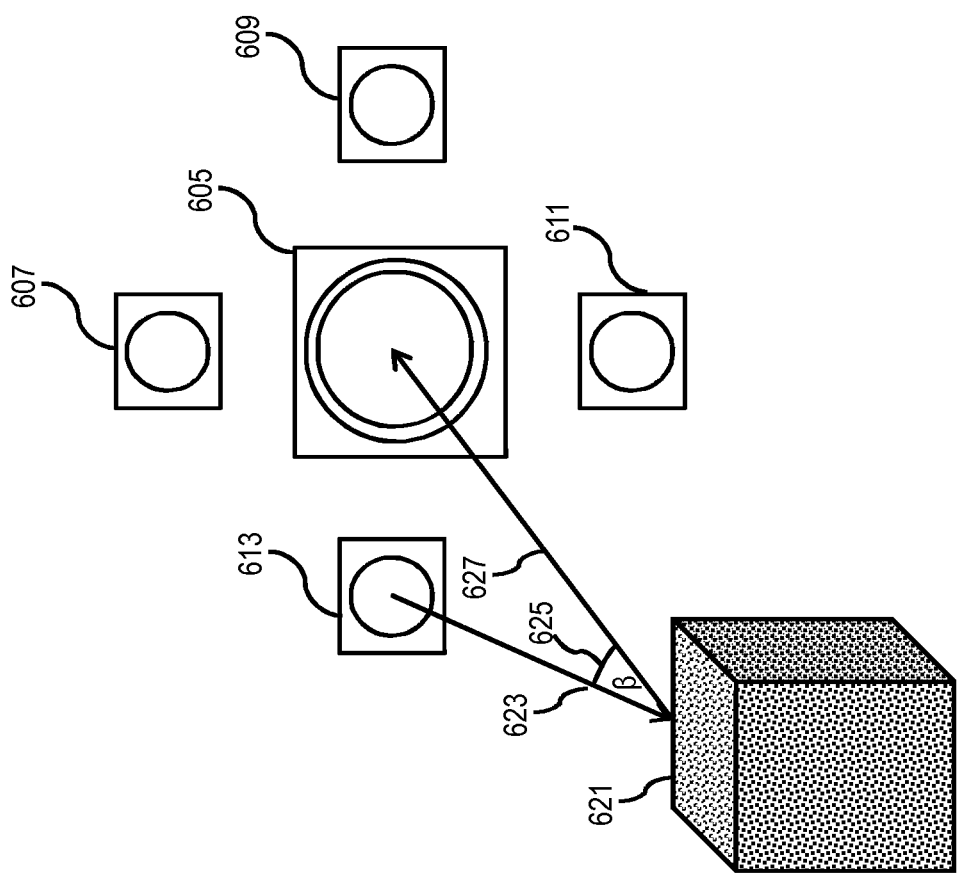

In one embodiment, the computation module 209 is used to cause, at least in part, at least one normalization of the reflected light intensity data based, at least in part, on a surface albedo of the at least one object. By way of example, to deal with surface albedo variation wherein the at least one object is not white, planar, and facing the time-of-flight sensor, the computation module 209 normalizes the intensity values as follows: $(I_0/I_m, I_1/I_m, I_2/I_m, I_3/I_m)$ where $I_m$=min $(I_0, I_1, I_2, I_3)$. The computation module 209 may also be used to cause, at least in part, at least one surface normal correction based, at least in part, on at least one construction of at least one range map, at least one surface normal, or a combination thereof. By way of example, assuming that the incident light direction and the current pixel location are known by the computation module 209, the computation module 209 may correct the cosine fall-off factor. More specifically, $$I_0 = \cos(\alpha)L_0$$

$$I'_0 = \cos(\beta)L_0$$

where $I_o'$ is the newly measured intensity level for the light 0; α is the angle between the incident light and the surface normal when the look-up table is constructed (e.g., angle 619 of FIG. 6A); and β is the angle for the new measurement (e.g., angle 625 of FIG. 6B). Once both values are determined by the computation module 209, the computation module 209 can determine the normal-corrected intensity value as follows:

$$I''_0 = \frac{I'_0}{\cos(\beta)} * \cos(\alpha).$$

Figure 3:
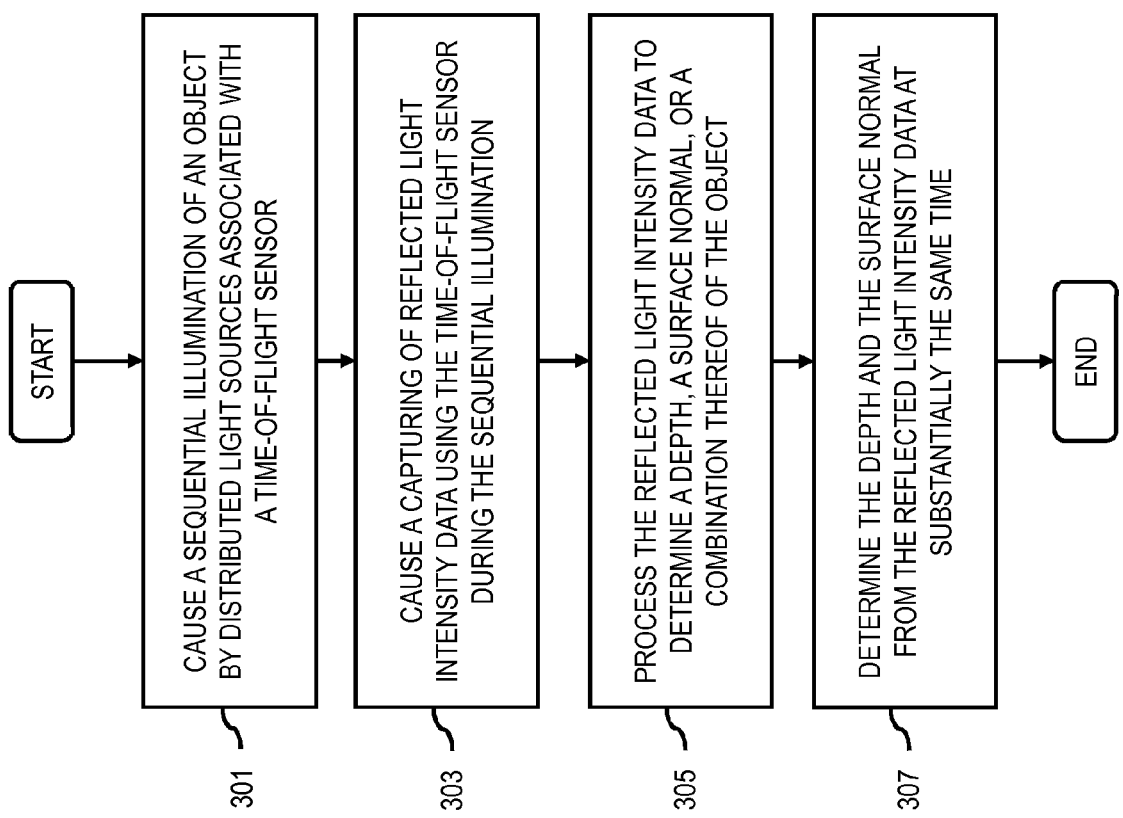
FIG. 3 is a flowchart of a process for acquiring both depth and surface normal of an object using a time-of-flight sensor with multiple distributed light sources, according to one embodiment.
Figure 8:
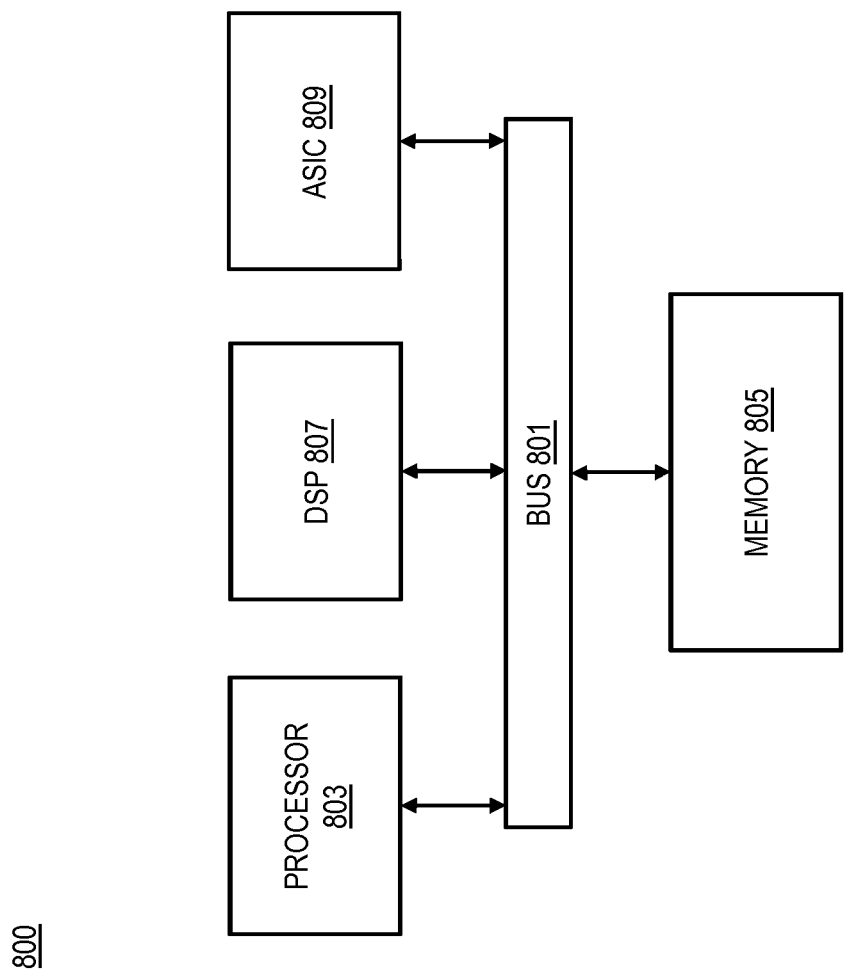
FIG. 8 is a diagram of a chip set that can be used to implement an embodiment of the invention.

FIG. 3 is a flowchart of a process for acquiring both depth and surface normal of an object using a time-of-flight sensor with multiple distributed light sources, according to one embodiment. In one embodiment, the imaging platform 111 performs the process 300 and is implemented in, for instance, a chip set including a processor and a memory as shown in FIG. 8. In step 301, the imaging platform 111 causes, at least in part, at least one sequential illumination of at least one object by a plurality of distributed light sources associated with a time-of-flight sensor. In one embodiment, it is contemplated that the plurality of distributed light sources (e.g., LEDs, laser diodes, or a combination thereof) include at least three (e.g., four) separately located light sources. By way of example, the at least three separately located sources may be arranged in a cross pattern around the time-of-flight sensor. In one embodiment, it is further contemplated that the at least one object is diffuse.

In step 303, the imaging platform 111 causes, at least in part, a capturing of reflected light intensity data using the time-of-flight sensor during the at least one sequential illumination. By way of example, the imaging platform 111 may capture at least three (e.g., four) reflected light intensity measures for a given pixel based, at least in part, on the at least one sequential illumination of the at least one object (e.g., using four separately located light sources).

In step 305, the imaging platform 111 processes and/or facilitates a processing of the reflected light intensity data to determine at least one depth, at least one surface normal, or a combination thereof of the at least one object. By way of example, it is contemplated that the imaging platform 111 can determine at least three intensity values (e.g., $I_0, I_1, I_2, I_3$) and a range D. In one embodiment, the imaging platform 111 may then process and/or facilitate a processing of the newly recorded intensity values as a vector and cause, at least in part, a comparison of the respective intensity values against one or more entries in a look-up table to find its closest neighbor in the look-up table. Thereafter, the imaging platform 111 may cause, at least in part, at least one assignment of the range value for the determined entry to be the depth value for this pixel. In one embodiment, if the at least one object is not white, planar, and facing the time-of-flight sensor, the imaging platform 111 processes and/or facilitates a processing of the reflected light intensity data to correct normal and to factor out the variation of albedo before causing, at least in part, a comparison of the respective intensity values against one or more entries in a look-up table.

In step 307, the imaging platform 111 determines the at least one depth and the at least one surface normal from the reflected light intensity data at substantially a same time. By way of example, once the imaging platform 111 causes, at least in part, a normal correction and factors out the variation of albedo for a non-white, non-planar, and non-facing the time-of-flight sensor object, the imaging platform 111 may determine both surface depth and normal at substantially the same time given the at least three (e.g., four) time-of-flight raw sensor images taken under at least one distributed light set up (e.g., four separately located LEDs).

Figure 4:
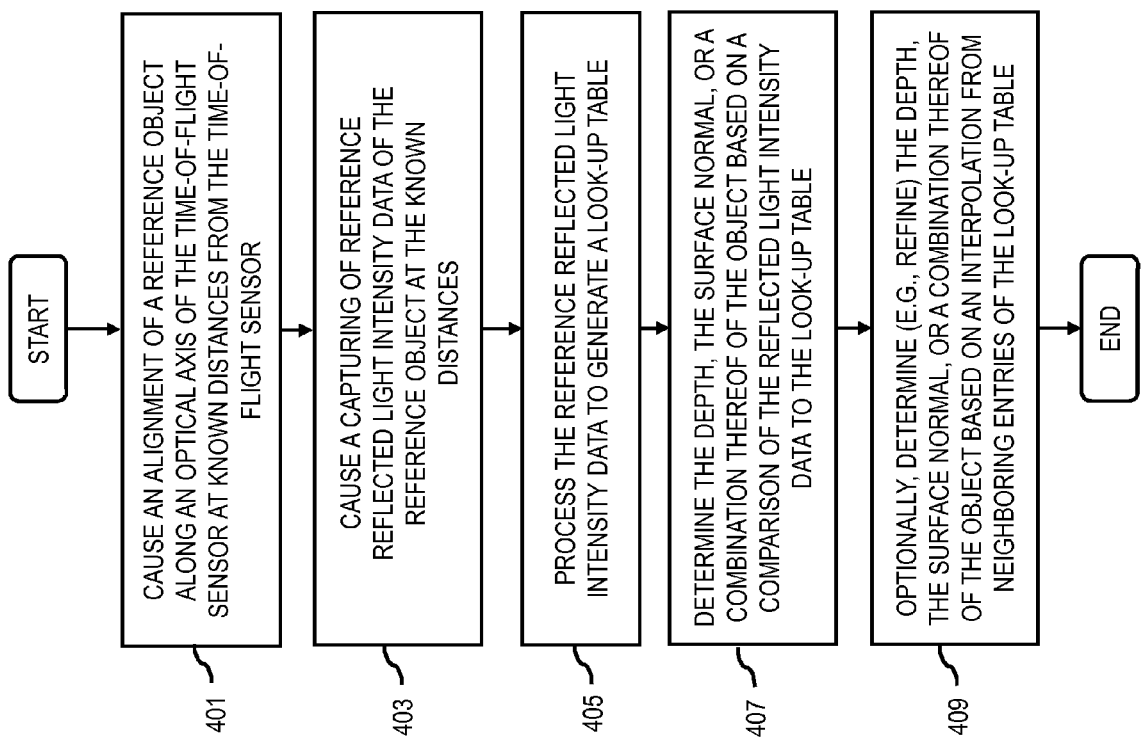
FIG. 4 is a flowchart of a process for determining depth and/or surface normal based, at least in part, on one or more entries in a look-up table, according to one embodiment.

FIG. 4 is a flowchart of a process for determining depth and/or surface normal based, at least in part, on one or more entries in a look-up table, according to one embodiment. In one embodiment, the imaging platform 111 performs the process 400 and is implemented in, for instance, a chip set including a processor and a memory as shown in FIG. 8. In step 401, the imaging platform 111 causes, at least in part, an alignment of at least one reference object along an optical axis of the time-of-flight sensor at a plurality of known distances from the time-of-flight sensor. In one example use case, if a look-up table for at least one object is contemplated for a range between 1 m and 5 m and with a depth resolution of at least 10 mm, then the imaging platform 111 may cause, at least in part, an alignment of at least one reference object (e.g., a piece of paper glued to a piece of cardboard) at 1 m, 1.01 m, . . . , 1.02 m, . . . , 4.99 m, 5 m.

In step 403, the imaging platform 111 causes, at least in part, a capturing of reference reflected light intensity data of the at least one reference object at the plurality of known distances. By way of example, it is contemplated that the imaging platform 111 may capture reference reflected light intensity data through the time-of-flight sensor for each of the separately located light sources (e.g., at least three images for each distance, each image taken with one light source (LED) turned on). It is further contemplated that the at least one sequential illumination of the at least one reference object is the same as the at least one sequential illumination (i.e., pattern) for the at least one object.

In step 405, the imaging platform 111 processes and/or facilitates a processing of the reference reflected light intensity data to generate at least one look-up table. By way of example, the imaging platform 111 may treat the newly recorded intensity values as a vector and store and/or organize them (e.g., in the calculation database 113).

In step 407, the imaging platform 111 determines the at least one depth, the at least one surface normal, or a combination thereof of the at least one object based, at least in part, on a comparison of the reflected light intensity data to the at least one look-up table. By way of example, the imaging platform 111 may cause, at least in part, a comparison of the respective light intensity values against one or more entries in the at least one look-up table to determine its closest neighbor in the look-up table and the range value for the determined entry may then be assigned by the imaging platform 111 to be the depth value for this pixel.

In step 409, the imaging platform 111 optionally determines (e.g., refines) the at least one depth, the at least one surface normal, or a combination thereof of the at least one object based, at least in part, on at least one interpolation from one or more neighboring entries of the at least one look-up table. In one example use case, the at least one interpolation is a linear interpolation.

Figure 5:
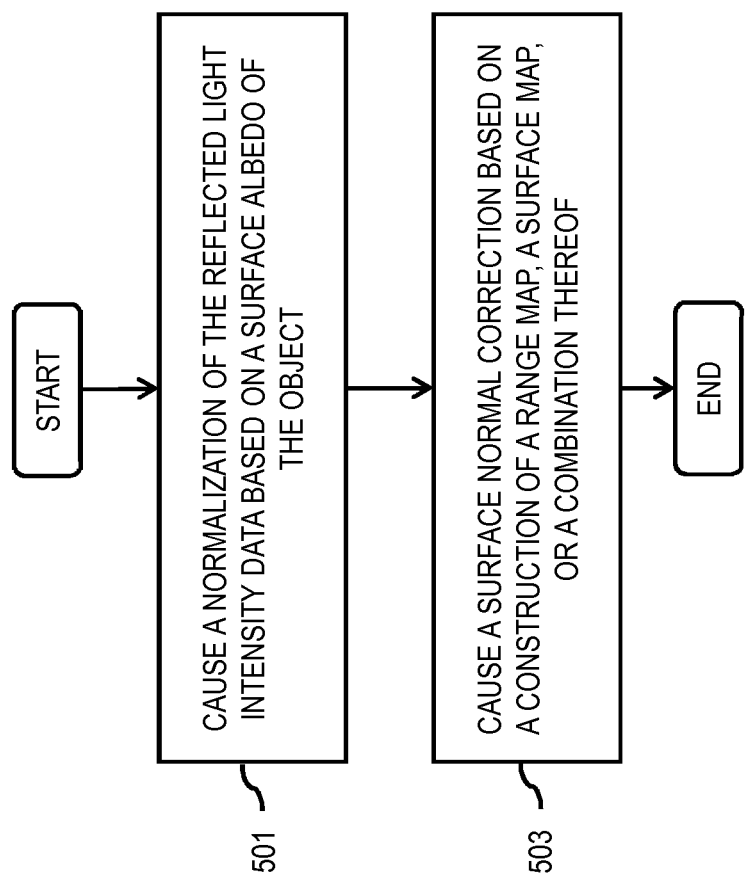
FIG. 5 is a flowchart of a process for normalizing surface albedo variations and/or surface normal variations, according to one embodiment.

FIG. 5 is a flowchart of a process for normalizing surface albedo variation and/or surface normal variations, according to one embodiment. In one embodiment, the imaging platform 111 performs the process 500 and is implemented in, for instance, a chip set including a processor and a memory as shown in FIG. 8. In step 501, the imaging platform 111 causes, at least in part, at least one normalization of the reflected light intensity data based, at least in part, on a surface albedo of the at least one object, wherein the at least one depth, the at least one surface normal, or a combination thereof of the at least one object is based, at least in part, on the normalization. In one embodiment, wherein the at least one object is not white, planar, and facing the time-of-flight sensor, the imaging platform 111 normalizes the reflected light intensity values to deal with surface albedo variation. For example, the normalized intensity vectors may be determined as follows: $(I_0/I_m, I_1/I_m, I_2/I_m, I_3/I_m)$ where $I_m=\min(I_0, I_1, I_2, I_3)$.

In step 503, the imaging platform 111 causes, at least in part, at least one surface normal correction based, at least in part, on at least one construction of the at least one range map, at least one surface normal map, or a combination thereof, wherein the at least one depth, the at least one surface normal, or a combination thereof of the at least one object is based, at least in part, on the at least one surface normal correction. In particular, the at least one construction of the at least one range map, at least one surface normal map, or a combination thereof is based, at least in part, on one or more photometric stereo techniques. In addition, it is contemplated that the imaging platform 111 is calibrated (i.e., that the incident light direction is known by the imaging platform 111, which is typical for photometric stereo). Given the surface normal at the current pixel location and the known incident light direction, the imaging platform 111 may correct the cosine fall-off. More specifically, $$I_0 = \cos(\alpha)L_0$$
$$I_0' = \cos(\beta)L_0$$

where $I_o'$ is the newly measured intensity level for the light 0; $\alpha$ is the angle between the incident light and the surface normal when the look-up table is constructed (e.g., angle 619 of FIG. 6A); and $\beta$ is the angle for the new measurement (e.g., angle 625 of FIG. 6B). Once both values are determined by the imaging platform 111, the imaging platform 111 may determine the normal-corrected intensity value as follows:

$$I_0'' = \frac{I_0'}{\cos(\beta)} * \cos(\alpha).$$

FIGS. 6A and 6B are diagrams of a time-of-flight design with multiple distributed light sources utilized in the processes of FIGS. 3-5, according to various embodiments. In one embodiment, the system 100 causes, at least in part, an alignment of the reference object 601 (e.g., a piece of white paper glued to a piece of cardboard) along an optical axis 603 of the time-of-flight sensor 605 at a plurality of known distances from the time-of-flight sensor 605. By way of example, if a look-up table for at least one object is contemplated for a range between 1 m and 5 m and with a depth resolution of at least 10 mm, then the system 100 may cause, at least in part, an alignment of the reference object 601 at 1 m, 1.01 m, . . . , 1.02 m, . . . , 4.99 m, 5 m.

In one embodiment, the system 100 causes, at least in part, a capturing of the reference reflected light intensity data of the reference object 601 at the plurality of known distances (e.g., 1 m, 1.01 m, . . . , 1.02 m, . . . , 4.99 m, 5 m). In particular, it is contemplated that the system 100 may capture reference reflected light intensity data through the time-of-flight sensor 605 for each of the separately located light sources 607, 609, 611, and 613 (e.g., four images for each distance, each image taken with one light source (LED) turned on). By way of example, light ray 615 (e.g., incident light) is emitted by light 613, the dashed line 617 represents the surface normal, a is the angle 619 between the incident light and the surface normal, and the reflected light ray 621 is captured by the time-of-flight sensor 605. In one embodiment, the system 100 processes and/or facilitates a processing of the reference reflected light intensity to generate at least one look-up table (not shown for illustrative convenience).

In one embodiment, the system 100 causes, at least in part, one sequential illumination of the object 621 by the lights 607, 609, 611, and 613, as depicted in FIG. 6B. For example, it is contemplated that the object 621 is diffuse. In one embodiment, the system 100 causes, at least in part, a capturing of the reflected light intensity using the time-offlight sensor 605 during the sequential illumination (e.g., light 607, light 609, light 611, and then light 613). By way of example, light ray 623 (e.g., incident light) is emitted by light 613, β is the angle 625 for the new measurement, and the reflected light ray 627 is captured by the time-of-flight sensor 605. In particular, the system 100 may capture four reflected light intensity measures for a given pixel based, at least in part, on the sequential illumination of the object 621. It is further contemplated that the at least one sequential illumination of the objet 621 is the same as the sequential illumination of the reference object 601 (e.g., light 607, light 609, light 611, and then light 613). In one embodiment, the system 100 determines the at least one depth, the at least one surface normal, or a combination thereof of the object 621 based, at least in part, on at least one comparison of the reflected light intensity data to the at least one look-up table. For example, the system 100 may cause, at least in part, a comparison of the respective light intensity values against one or more entries in the at least one look-up table to determine its closest neighbor in the look-up table and the range value for the determined entry may then be assigned by the system 100 to be the depth value for this pixel.

However, in one embodiment, wherein the object 621 is not white, planar, and facing the time-of-flight sensor (as shown in FIG. 6B), the system 100 may cause, at least in part, at least one normalization of the reflected light intensity data based, at least in part, on a surface albedo of the object 621 to determine the at least one depth, the at least one surface normal, or a combination thereof of the object 621. In addition, in one embodiment, the system 100 may also cause, at least in part, at least one surface normal correction based, at least in part, on at least one construction of at least one range map, at least one surface normal map, or a combination thereof (not shown for illustrative convenience) to determine the at least one depth, the at least one surface normal, or a combination thereof of the object 621. In one embodiment, once the system 100 determines the normal-corrected intensity values, the system 100 can determine both surface depth and normal at substantially the same time given the four time-of-flight raw sensor images taken under the distributed light set up (e.g., lights 607, 609, 611, and 613 distributed around the time-of-flight sensor 605).

The processes described herein for acquiring both depth and surface normal of an object using a time-of-flight sensor with multiple distributed light sources may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
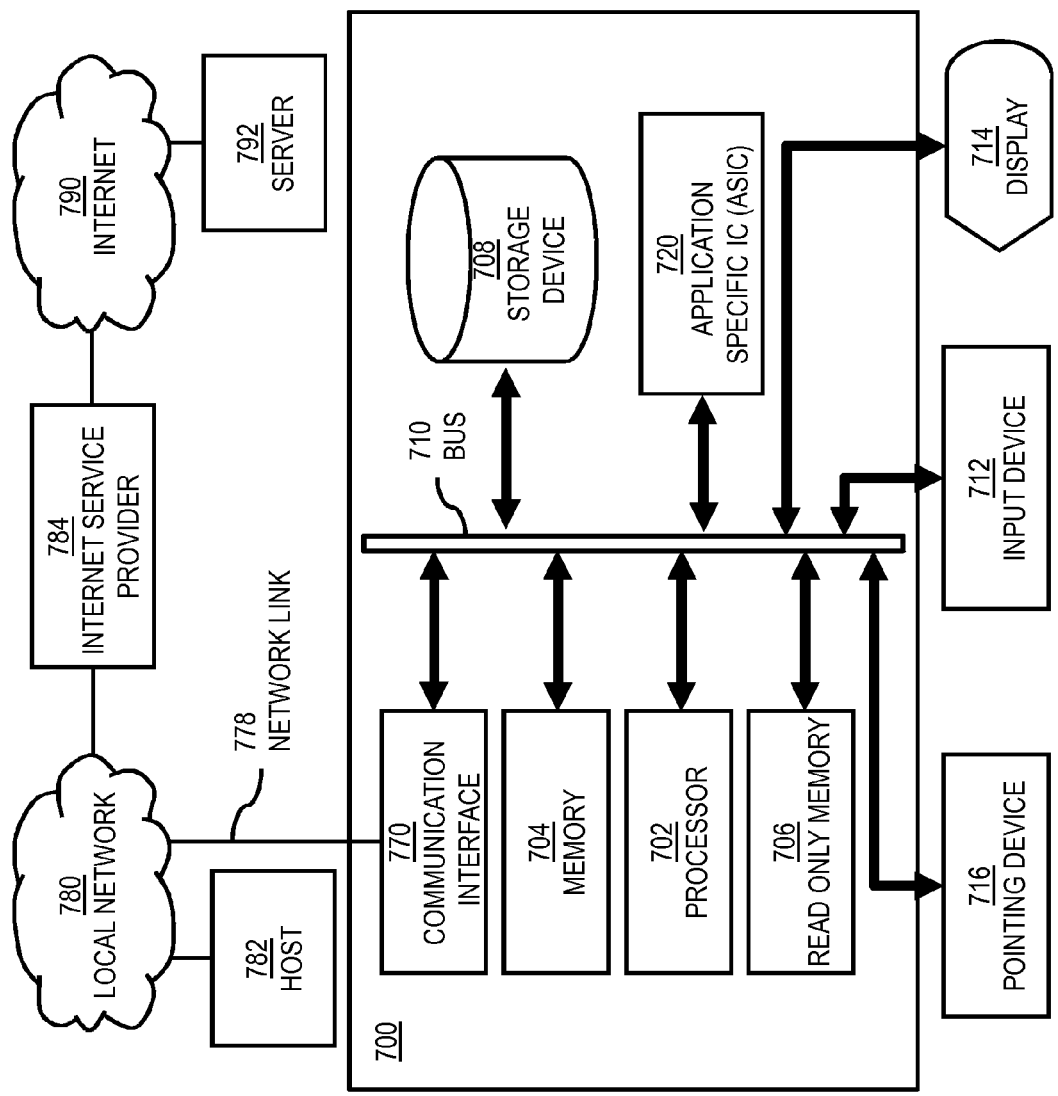
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to acquire both depth and surface normal of an object using a time-of-flight sensor with multiple distributed light sources as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of acquiring both depth and surface normal of an object using a time-of-flight sensor with multiple distributed light sources.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to acquire both depth and surface normal of an object using a time-of-flight sensor with multiple distributed light sources. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for acquiring both depth and surface normal of an object using a time-of-flight sensor with multiple distributed light sources. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for acquiring both depth and surface normal of an object using a time-of-flight sensor with multiple distributed light sources, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 107 for acquiring both depth and surface normal of an object using a time-of-flight sensor with multiple distributed light sources to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to acquire both depth and surface normal of an object using a time-of-flight sensor with multiple distributed light sources as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of acquiring both depth and surface normal of an object using a time-of-flight sensor with multiple distributed light sources.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to acquire both depth and surface normal of an object using a time-of-flight sensor with multiple distributed light sources. The memory 805 also stores the data associated with or generated by the execution of the inventive steps.

Figure 9:
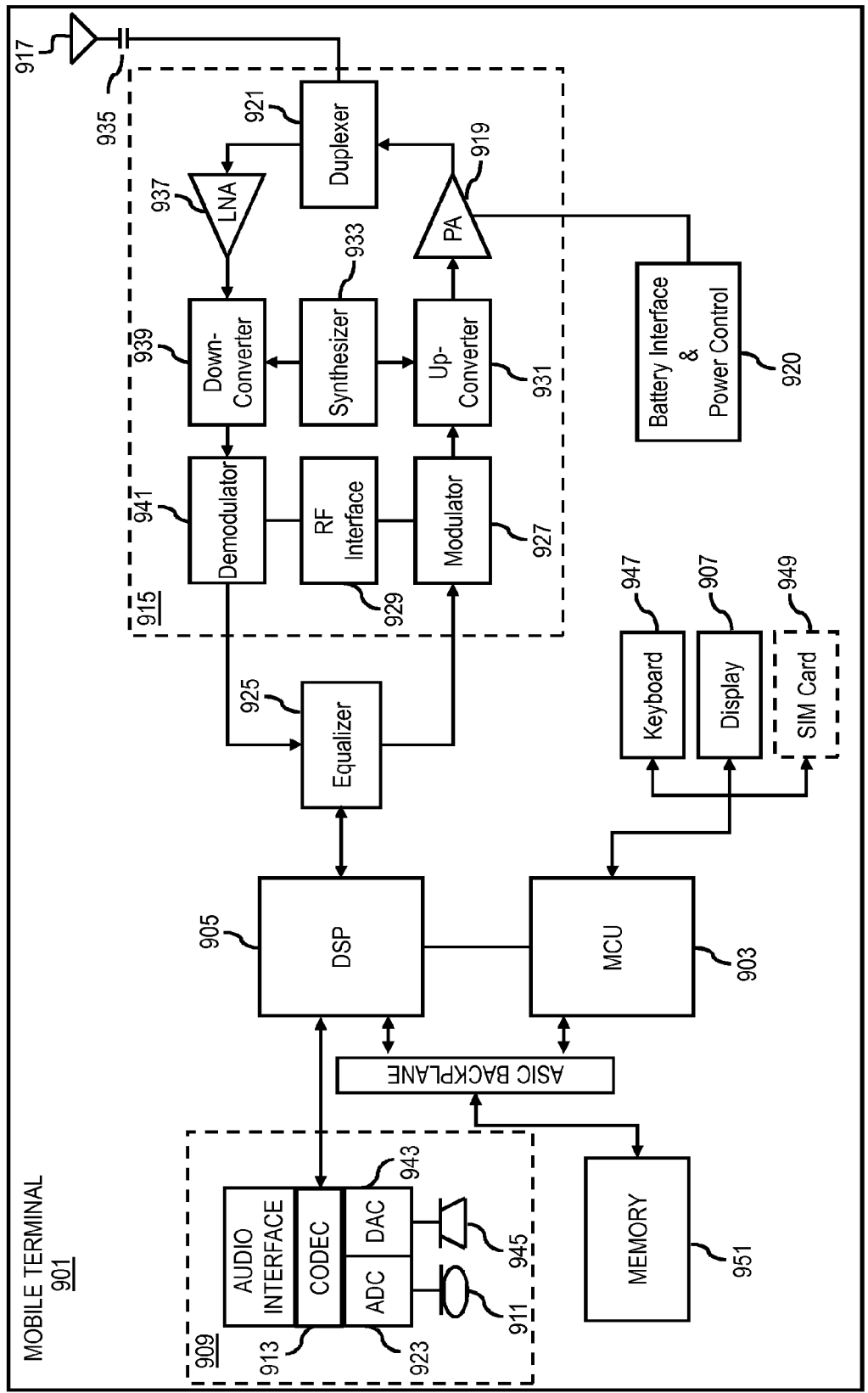
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of acquiring both depth and surface normal of an object using a time-of-flight sensor with multiple distributed light sources. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of acquiring both depth and surface normal of an object using a time-of-flight sensor with multiple distributed light sources. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to acquire both depth and surface normal of an object using a time-of-flight sensor with multiple distributed light sources. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
causing, at least in part, at least one sequential illumination of at least one object by a plurality of distributed light sources associated with a time-of-flight sensor;
causing, at least in part, a capturing of reflected light intensity data using the time-of-flight sensor during the at least one sequential illumination;
processing and/or facilitating a processing of the reflected light intensity data to determine at least one depth, at least one surface normal, or a combination thereof of the at least one object;
causing, at least in part, an alignment of at least one reference object along an optical axis of the time-of-flight sensor at a plurality of known distances from the time-of-flight sensor;
causing, at least in part, a capturing of reference reflected light intensity data of the at least one reference object at the plurality of known distances; and
processing and/or facilitating a processing of the reference reflected light intensity data to generate at least one look-up table.

2. A method of claim 1, wherein the plurality of distributed light sources includes at least three separately located light sources.

3. A method of claim 1, further comprising
determining the at least one depth, the at least one surface normal, or a combination thereof of the at least one object based, at least in part, on a comparison of the reflected light intensity data to the at least one look-up table.

4. A method of claim 1, further comprising:
determining the at least one depth, the at least one surface normal, or a combination thereof of the at least one object based, at least in part, on at least one interpolation from one or more neighboring entries of the at least one look-up table.

5. A method of claim 1, wherein the at least one reference object is a white planar object that faces the time-of-flight sensor.

6. A method of claim 1, further comprising:
causing, at least in part, at least one normalization of the reflected light intensity data based, at least in part, on a surface albedo of the at least one object,
wherein the at least one depth, the at least one surface normal, or a combination thereof of the at least one object is based, at least in part, on the normalization.

7. A method of claim 1, further comprising:
causing, at least in part, at least one surface normal correction based, at least in part, on at least one construction of the at least one range map, at least one surface normal map, or a combination thereof,
wherein the at least one depth, the at least one surface normal, or a combination thereof of the at least one object is based, at least in part, on the at least one surface normal correction.

8. A method of claim 7, wherein the at least one construction of the at least one range map, at least one surface normal map, or a combination thereof is based, at least in part, on one or more photometric stereo techniques.

9. A method of claim 1, further comprising:
determining the at least one depth and the at least one surface normal from the reflected light intensity data at substantially a same time.

10. An apparatus comprising:
at least one processor; and
at least one memory including computer program code for one or more programs,
the at least one memory and the computer program code configured to, with the at least one processor, cause the apparatus to perform at least the following,
cause, at least in part, at least one sequential illumination of at least one object by a plurality of distributed light sources associated with a time-of-flight sensor;
cause, at least in part, a capturing of reflected light intensity data using the time-of-flight sensor during the at least one sequential illumination;
process and/or facilitate a processing of the reflected light intensity data to determine at least one depth, at least one surface normal, or a combination thereof of the at least one object;
cause, at least in part, an alignment of at least one reference object along an optical axis of the time-of-flight sensor at a plurality of known distances from the time-of-flight sensor;
cause, at least in part, a capturing of reference reflected light intensity data of the at least one reference object at the plurality of known distances; and
process and/or facilitate a processing of the reference reflected light intensity data to generate at least one look-up table.

11. An apparatus of claim 10, wherein the apparatus is further caused to:
determine the at least one depth, the at least one surface normal, or a combination thereof of the at least one object based, at least in part, on a comparison of the reflected light intensity data to the at least one look-up table.

12. An apparatus of claim 10, wherein the apparatus is further caused to:
cause, at least in part, at least one normalization of the reflected light intensity data based, at least in part, on a surface albedo of the at least one object,
wherein the at least one depth, the at least one surface normal, or a combination thereof of the at least one object is based, at least in part, on the normalization.

13. An apparatus of claim 10, wherein the apparatus is further caused to:
cause, at least in part, at least one surface normal correction based, at least in part, on at least one construction of the at least one range map, at least one surface normal map, or a combination thereof, wherein the at least one depth, the at least one surface normal, or a combination thereof of the at least one object is based, at least in part, on the at least one surface normal correction.

14. An apparatus of claim 13, wherein the at least one construction of the at least one range map, at least one surface normal map, or a combination thereof is based, at least in part, on one or more photometric stereo techniques.

15. An apparatus of claim 10, wherein the apparatus is further caused to:
determine the at least one depth and the at least one surface normal from the reflected light intensity data at substantially a same time.

16. A non-transitory computer-readable storage medium carrying one or more sequences of one or more instructions which, when executed by one or more processors, cause an apparatus to at least perform the following steps:
causing, at least in part, at least one sequential illumination of at least one object by a plurality of distributed light sources associated with a time-of-flight sensor;
causing, at least in part, a capturing of reflected light intensity data using the time-of-flight sensor during the at least one sequential illumination;
processing and/or facilitating a processing of the reflected light intensity data to determine at least one depth, at least one surface normal, or a combination thereof of the at least one object;
causing, at least in part, an alignment of at least one reference object along an optical axis of the time-of-flight sensor at a plurality of known distances from the time-of-flight sensor;
causing, at least in part, a capturing of reference reflected light intensity data of the at least one reference object at the plurality of known distances; and
processing and/or facilitating a processing of the reference reflected light intensity data to generate at least one look-up table.

17. A non-transitory computer-readable storage medium of claim 16, wherein the apparatus is further caused to perform:
determining the at least one depth and the at least one surface normal from the reflected light intensity data at substantially a same time.

18. A non-transitory computer-readable storage medium of claim 16, wherein the apparatus is further caused to perform:
determining the at least one depth, the at least one surface normal, or a combination thereof of the at least one object based, at least in part, on a comparison of the reflected light intensity data to the at least one look-up table.

19. A non-transitory computer-readable storage medium of claim 16, wherein the apparatus is further caused to perform:
causing, at least in part, at least one surface normal correction based, at least in part, on at least one construction of the at least one range map, at least one surface normal map, or a combination thereof,
wherein the at least one depth, the at least one surface normal, or a combination thereof of the at least one object is based, at least in part, on the at least one surface normal correction.

20. A non-transitory computer-readable storage medium of claim 16, wherein the at least one construction of the at least one range map, at least one surface normal map, or a combination thereof is based, at least in part, on one or more photometric stereo techniques.

* * * * *